United States Patent
Rao et al.

(10) Patent No.: US 9,485,015 B2
(45) Date of Patent: Nov. 1, 2016

(54) OPTICAL LAYER STATUS EXCHANGE OVER OSC-OAM METHOD FOR ROADM NETWORKS

(75) Inventors: Rajan Rao, Cupertino, CA (US); Edward E. Sprague, Woodside, CA (US); Biao Lu, Saratoga, CA (US); Sharfuddin Syed, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 631 days.

(21) Appl. No.: 13/452,413

(22) Filed: Apr. 20, 2012

(65) Prior Publication Data

US 2013/0121685 A1 May 16, 2013

Related U.S. Application Data

(60) Provisional application No. 61/559,183, filed on Nov. 14, 2011.

(51) Int. Cl.
*H04B 10/077* (2013.01)
*H04J 14/02* (2006.01)
*H04J 3/14* (2006.01)

(52) U.S. Cl.
CPC .......... *H04B 10/0773* (2013.01); *H04J 3/14* (2013.01); *H04J 14/0212* (2013.01); *H04J 14/0273* (2013.01); *H04J 14/0275* (2013.01); *H04B 2210/072* (2013.01); *H04J 14/0268* (2013.01); *H04J 2203/006* (2013.01); *H04J 2203/0057* (2013.01); *H04J 2203/0096* (2013.01)

(58) Field of Classification Search
USPC .............. 370/389, 384, 373, 377, 241, 242
See application file for complete search history.

(56) References Cited

U.S. PATENT DOCUMENTS

| | | | |
|---|---|---|---|
| 6,441,955 B1* | 8/2002 | Takatsu et al. ............ 359/341.4 |
| 6,626,587 B1* | 9/2003 | Marmur ......................... 398/17 |
| 7,085,293 B2* | 8/2006 | Raghavan et al. ............ 370/506 |
| 7,471,898 B2* | 12/2008 | Shin et al. ..................... 398/30 |
| 7,606,488 B2* | 10/2009 | Sugaya .......................... 398/34 |
| 2002/0109879 A1* | 8/2002 | Wing So ....................... 359/118 |
| 2004/0208552 A1* | 10/2004 | Harney et al. .................. 398/51 |
| 2005/0185958 A1* | 8/2005 | Atsumi et al. .................. 398/49 |
| 2012/0321306 A1* | 12/2012 | Wellbrock et al. ............. 398/48 |

* cited by examiner

*Primary Examiner* — Mohammad Anwar
(74) *Attorney, Agent, or Firm* — Dunlop Codding LLP; David L. Soltz

(57) ABSTRACT

A method for receiving, by circuitry of an optical node adapted for wavelength multiplexing and wavelength switching, a signal over OSC comprising overhead information indicative of status of at least one of an optical layer in an OTN; wherein the signal utilizes OC-N frame format comprising a first STS frame, a second STS frame, and a third STS frame, the STS frames having a format wherein the information is assigned to a number of bits designated for OAM information, wherein the bits are assigned to bytes within a transport overhead portion of the STS frame format within the OC-N frame format; terminating, by circuitry of the optical node, the signal at the optical node; and notifying, by circuitry of the optical node, software of the status of the optical layer in the OTN.

21 Claims, 16 Drawing Sheets

| Failure | Description | Signal | |
|---|---|---|---|
| BDI-P | Used for Section monitoring; BDI for OTS payload SF status | 1-bit field | —102 |
| BDI-O | BDI for OTS – OH SF | 1-bit field | —104 |
| PMI | Payload Missing to suppress LOS | 1-bit field | —106 |
| TTI | 64 byte string (multi-frame) | 8-bits field | —108 |

STS-1 Transport Overhead

| | | | 54 | | | 56 | | |
|---|---|---|---|---|---|---|---|---|
| Line | Pointer H1 | Pointer H2 | Pointer Action H3 | | | | | |
| | BIP-8 B2 | APS K1/Undefined | APS K2/Undefined | | | | | |
| | Data Com D4/Undefined | Data Com D5/Undefined | Data Com D6/Undefined | | | | | |
| | Data Com D7/Undefined | Data Com D8/Undefined | Data Com D9/Undefined | | | | | |
| | Data Com D10/Undefined | Data Com D11/Undefined | Data Com D12/Undefined | | | | | |
| | Sync Status/Growth S1/Z1/Undefined | REI-L/Growth M1 or M1/Z2/Undefined or M0&M1/Z2/Undefined | Orderwire E2/Undefined | | | | | |

Figure 4

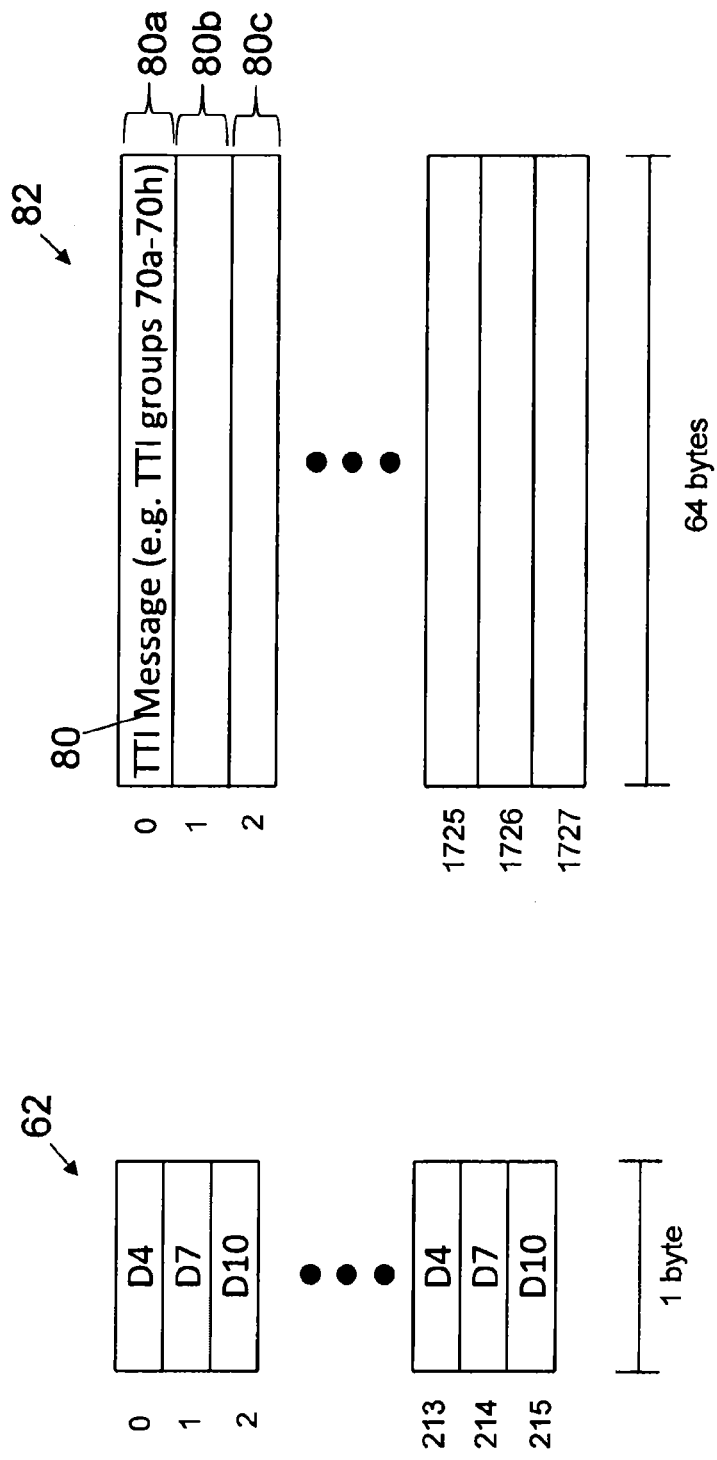

| Failure | Description | Signal |
|---|---|---|
| BDI-P | Used for Section monitoring; BDI for OTS payload SF status | 1-bit field |
| BDI-O | BDI for OTS – OH SF | 1-bit field |
| PMI | Payload Missing to suppress LOS | 1-bit field |
| TTI | 64 byte string (multi-frame) | 8-bits field |

Figure 9

| Failure | Description | Signal |
|---|---|---|
| BDI-P | For OMS section monitoring; BDI signal used to convey OMS payload SF status | 1-bit field — 110 |
| BDI-O | Used to convey OH SF status to upstream | 1-bit field — 112 |
| PMI | Payload Missing to suppress LOS when no OCh present – a downstream indication | 2-bit field — 114<br>Like STAT field:<br>0 0 – Normal<br>0 1 – FDI-P<br>1 0 – PMI |
| FDI-P | Used to convey status of payload signal in downstream direction (Normal, Failed) – Useful @OLA sites | |
| FDI-O | Used to convey status of OH signal in downstream direction (Normal, Failed) | 1-bit field — 116 |

Figure 11

| Failure | Description | Signal |
|---|---|---|
| FDI-O | Used to convey status of OH signal in forward direction (Normal, Failed) | 1-bit field —120 |
| FDI-P | Payload signal status in forward direction (Normal, Failed) | 2-bit field Like STAT field: 0 0 – Normal 0 1 – FDI-P 1 0 – OCI —122 |
| OCI | Open conn indication – sent downstream when connection is removed locally | |
| BDI-P | Used for Restoration in uni-directional failure situation (not in G.709) | 1-bit field —124 |
| CSF | Client Signal Failure (not in G.709); may be used to isolate client failures from network failures | 1-bit field —126 |
| TTI | Trail Trace for Fault localization and verification | 8-bit field —128 |

Figure 13

OPTICAL LAYER STATUS EXCHANGE
OVER OSC-OAM METHOD FOR ROADM
NETWORKS

CROSS-REFERENCE TO RELATED
APPLICATIONS

The present patent application claims priority to the provisional patent application identified by U.S. Ser. No. 61/559,183 titled "OPTICAL LAYER STATUS EXCHANGE OVER OSC-OAM METHOD FOR ROADM NETWORKS" filed on Nov. 14, 2011, the entire content of which is hereby incorporated herein by reference.

FIELD OF THE DISCLOSURE

The disclosure generally relates to methods and apparatuses for Operation, Administration & Maintenance (OAM) in optical transport networks (OTN). More particularly the disclosure relates to mapping optical layer overhead OAM information to specific overhead bits and assigning the overhead bits to specific Optical Supervisory Channel (OSC) overhead bytes.

BACKGROUND

An Optical Transport Network (OTN) is comprised of a plurality of switch nodes linked together to form a network. The OTN includes an electronic layer and an optical layer. The electronic layer and the optical layer each contain multiple sub-layers, further described herein. OTN structure, architecture, and modeling are further described in the International Telecommunication Union recommendations, including ITU-T G.709, ITU-T G.872, and ITU-T G.805, which are well known in the art. In general, the OTN is a combination of the benefits of SONET/SDH technology and dense wavelength-division multiplexing (DWDM) technology (optics).

The construction and operation of switch nodes (also referred to as "nodes") in the OTN is well known in the art. In general, the nodes of an OTN are generally provided with a control module, input interface(s) and output interface(s). The control modules of the nodes in the OTN function together to aid in the control and management of the OTN. The control modules can run a variety of protocols for conducting the control and management (i.e. Operation, Administration and Maintenance—referred to as OAM) of the OTN. One prominent protocol is referred to in the art as Generalized Multiprotocol Label Switching (GMPLS).

Generalized Multiprotocol Label Switching (GMPLS) is a type of protocol which extends multiprotocol label switching (MLS) to encompass network schemes based upon time-division multiplexing (e.g. SONET/SDH, PDH, G.709), wavelength multiplexing, and spatial switching (e.g. incoming port or fiber to outgoing port or fiber). Multiplexing is when two or more signals or bit streams are transferred over a common channel.

Wave-division multiplexing is a type of multiplexing in which two or more optical carrier signals are multiplexed onto a single optical fiber by using different wavelengths (that is, colors) of laser light.

Lightpaths are optical connections carried over a wavelength, end to end, from a source node to a destination node in an optical transport network (OTN). Typically, the lightpaths pass through intermediate links and intermediate nodes in the OTN. At the intermediate nodes, the lightpaths may be routed and switched from one intermediate link to another intermediate link. In some cases, lightpaths may be converted from one wavelength to another wavelength at the intermediate nodes.

An exemplary OTN may contain multiple optical nodes, such as optical line terminals (OLTs), optical crossconnects (OXCs), optical line amplifiers, optical add/drop multiplexer (OADMs) and/or reconfigurable optical add/drop multiplexers (ROADMs), interconnected by way of intermediate links. OLTs may be used at either end of a connection or intermediate link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers" and U.S. Pat. No. 7,394,953 titled "Configurable Integrated Optical Combiners and Decombiners", which are incorporated herein by reference in their entirety.

As previously mentioned, optical transport networks (OTN) have multiple layers including an electronic layer and an optical layer. The electronic layer includes an optical channel transport unit (OTU) sub-layer and an optical channel data unit (ODU) sub-layer. The optical layer has multiple sub-layers, including the Optical Channel (OCh) layer, the Optical Multiplex Section (OMS) layer, and the Optical Transmission Section (OTS) layer. The optical layer provides optical connections, also referred to as optical channels or lightpaths, to other layers, such as the electronic layer. The optical layer performs multiple functions, such as monitoring network performance, multiplexing wavelengths, and switching and routing wavelengths. The Optical Channel (OCh) layer manages end-to-end routing of the lightpaths through the optical transport network (OTN). The Optical Multiplex Section (OMS) layer network provides the transport of optical channels through an optical multiplex section trail between access points. The Optical Transmission Section (OTS) layer network provides for the transport of an optical multiplex section through an optical transmission section trail between access points. The OCh layer, the OMS layer, and the OTS layer have overhead which may be used for management purposes. The overhead may be transported in an Optical Supervisory Channel (OSC).

The Optical Supervisory Channel (OSC) is an additional wavelength that is adapted to carry information about the network and may be used for management functions. The OSC is carried on a different wavelength than wavelengths carrying actual data traffic and is an out-of-band channel. Typically, the OSC is used hop-by-hop and is terminated and restarted at every node.

A Super-Channel (SCh) is a collection of one or more frequency slots to be treated as a unified entity for management and control plane purposes. A Frequency Slot is a range of frequency allocated to a given channel and unavailable to other channels within the same flexible grid. A frequency slot is a contiguous portion of the spectrum available for an optical passband filter. A frequency slot is defined by its nominal central frequency and its slot width. A frequency slot is further defined in the International Telecommunications Union Recommendation ITU-T G.694.1, "Spectral grids for WDM applications: DWDM frequency grid".

A contiguous spectrum Super-Channel is a Super-Channel with a single frequency slot. A split-spectrum Super-Channel is a Super-Channel with multiple frequency slots.

The International Telecommunications Union (ITU) recommendation ITU-T G.709 further defines the OTS, OMS and OCh layers and recommends use of the OSC to carry overhead corresponding to the layers. Additionally, ITU-T recommendation G.872 specifies defects for the OTS, OMS, and OCh layers as well as specifying Operation, Administration & Maintenance (OAM) requirements.

ITU-T recommendations suggest that the OSC utilize a Synchronous Transport Signal (STS) Optical Carrier transmission rate OC-3. Optical Carrier transmission rates are a standardized set of specifications of transmission bandwidth for digital signals that can be carried on fiber optic networks. The OC-3 frame contains three column-interleaved STS Level 1 (STS-1) frames; therefore, the line overhead consists of an array of six rows by nine columns (that is, bytes). The OC-3 frame format is further defined in Telecordia's Generic Requirements GR-253, "Synchronous Optical Network Common Generic Criteria," Issue 4. The OC-3 frame format contains a transport overhead portion. Within the transport overhead portion, bytes designated as D4, D5, D6, D7, D8, D9, D10, D11, and D12 are defined by GR-253 for use by Data Communication Channel (DCC).

However, the mechanisms and protocols to carry Operation, Administration, and Maintenance (OAM) information over the OSC are not defined. A method is needed for supporting OAM functions for the optical layers, for example, for carrying defect information and overhead in the OSC.

The present disclosure addresses these deficiencies with methodology and apparatus for supporting OAM functions such as continuity, connectivity and signal quality supervision for optical layers. Specifically, the methodology discloses mapping optical layer overhead OAM information to specific overhead bits and assigning the overhead bits to specific OSC overhead bytes. This provides reliable exchange of overhead bytes over OSC between nodes. This methodology may be applied to Super Channel (SCh) connections as well as Optical Channels (OCh). Status information carried in the overhead may be used for restoration purposes in the optical transport network. The status information may also be used in support for tandem connection monitoring (TCM) configurations.

SUMMARY

Method and nodes are disclosed. In one embodiment, the problem of supporting OAM functions for optical layers and optical nodes is addressed by mapping optical layer overhead OAM information to specific overhead bits and assigning the overhead bits to specific OSC overhead bytes. In one embodiment the specific OSC overhead bytes are in an OC-N frame, where N may be 3, 12, 48, 192, or 768.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 4 is an illustration of a transport overhead portion of a synchronous transport signal level one (STS-1) format.

FIG. 6 is an illustration of a Multi-frame & Alarm Bits Area across frames to carry alarm/status information for optical channels (OCh) or Super Channels (SCh).

FIG. 7 is an illustration of a TTI multi-frame.

FIG. 9 is an illustration of the mapping of OTS OAM bits.

FIG. 11 is an illustration of the mapping of the OMS OAM bits to/from an optical supervisory channel.

FIG. 13 is an illustration of the mapping of the OCh or Super Channels (SCh) OAM bits to/from an optical supervisory channel.

DETAILED DESCRIPTION

Figure 1:
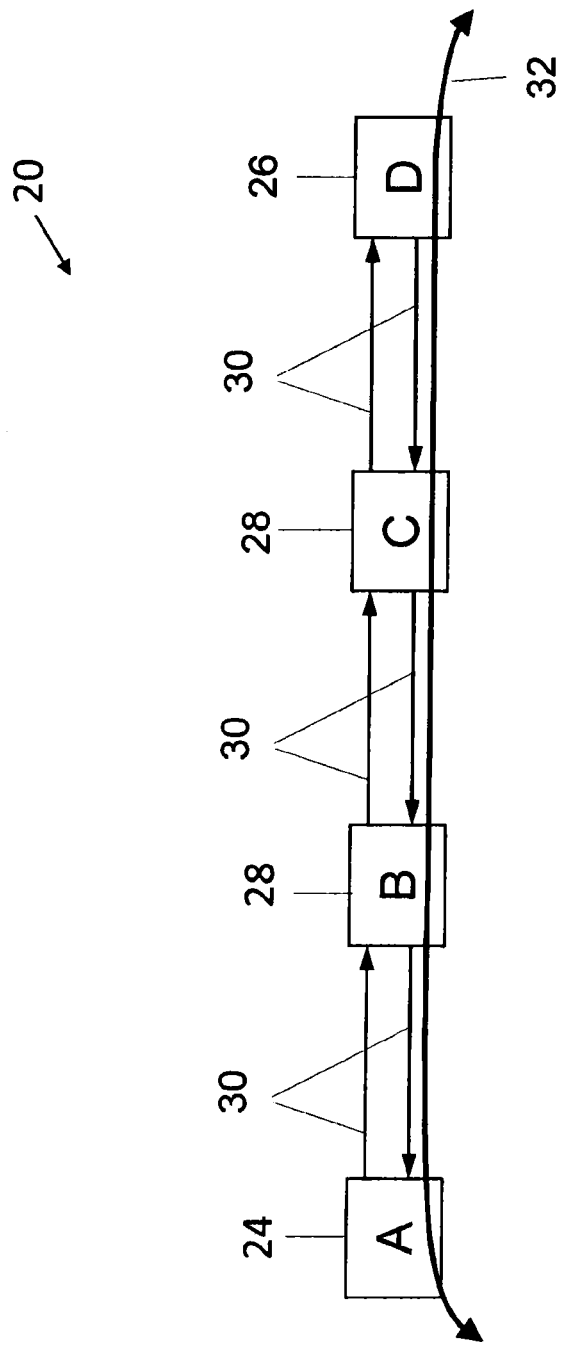
FIG. 1 is an illustration of an exemplary optical transport network.

The following detailed description refers to the accompanying drawings. The same reference numbers in different drawings may identify the same or similar elements.

The mechanisms proposed in this disclosure circumvent the problems described above. The present disclosure describes methods and apparatuses for mapping optical layer overhead OAM information to specific overhead bits and assigning the overhead bits to specific OSC OC overhead bytes.

DEFINITIONS

If used throughout the description and the drawings, the following short terms have the following meanings unless otherwise stated:

BDI stands for Backward Defect Indication. A single-bit BDI field, for example, can convey, towards the source, a signal fail status detected in a tandem connection termination sink function. BDI-P stands for Backward Defect Indication for Payload signal fail status. BDI-O stands for Backward Defect Indication for Overhead signal fail status.

DWDM stands for dense wavelength division multiplexing. DWDM multiplexes multiple optical carrier signals, such as Optical Channel (OCh) signals or Super Channel (SCh) signals, onto a single optical fiber by using different laser light wavelengths (colors).

FDI stands for Forward Defect Indication. FDI-P stands for Forward Defect Indication for Payload signal fail status. FDI-O stands for Forward Defect Indication for Overhead signal fail status.

FEC stands for forward error correction.

FPGA stands for field programmable gate array. FPGAs can be programmed after deployment in a system.

FRU stands for field replaceable unit.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

LOS stands for Loss of Signal.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OAM stands for Operation, Administration and Maintenance. Examples of OAM functions include continuity, connectivity and signal quality supervision.

OADM stands for optical add/drop multiplexer. ROADM stands for reconfigurable optical add/drop multiplexer. Network operators can remotely reconfigure the multiplexer by sending soft commands with a ROADM.

OC stands for optical carrier. Optical carrier transmission rates are a standardized set of specifications of transmission bandwidths for digital signals that can be carried on fiber optic networks.

OCh stands for Optical Channel layer.

OLT stands for Optical Line Terminal.

OMS stands for Optical Multiplex Section layer.

OSC stands for Optical Supervisory Channel.

OTN stands for Optical Transport Network which includes a set of optical switch nodes which are connected by optical fiber links. ITU-T recommendations G.709 and G.872 define OTN interface requirements and network architecture respectively.

OTS stands for Optical Transmission Section layer.

SCh stands for Super Channel.

SF stands for Signal Failure

SONET/SDH stands for Synchronous Optical Networking/Synchronous Digital Hierarchy which are standardized multiplexer protocols that transfer multiple digital bit streams over optical fiber using lasers or light emitting diodes.

STS stands for Synchronous Transport Signal. STS-1 stands for Synchronous Transport Signal—Level 1.

TCM stand for Tandem Connection Monitoring.

TTI stands for Trail Trace Identifier. An exemplary TTI for optical transport networks is defined in G.709.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In accordance with the present disclosure, messages transmitted between nodes can be processed by circuitry within the input interface(s), and/or the output interface(s) and/or the control module. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations. Additionally, it should be understood that the node can be implemented in a variety of manners as is well known in the art.

An exemplary optical transport network (OTN) 20 is shown in FIG. 1, by way of example. In FIG. 1, the optical transport network includes switch nodes 22 (hereinafter referred to as "nodes") labeled as A, B, C, and D. Some of the nodes 22 are denoted as a headend node 24 (also known as a source node) or tailend node 26 (also known as a destination node) for a particular path in accordance to the path setup direction. Other nodes 22 between the headend node 24 and tailend node 26 in a particular path are known as intermediate nodes 28. In this example, the optical transport network 20 includes headend node 24 A, tailend node 26 D, and intermediate nodes 28 B and C. In between the nodes 22 are intermediate links 30. A sub-network connection 32 (SNC) can be established from headend node 24 A, through intermediate nodes 28 B and D, to tailend node 26 D. The sub-network connection 32 may be of any type, for example, working, protecting, restorable, or unprotected. The optical transport network 20 may be configured in any topology, for example, linear, ring, or mesh.

Figure 2:
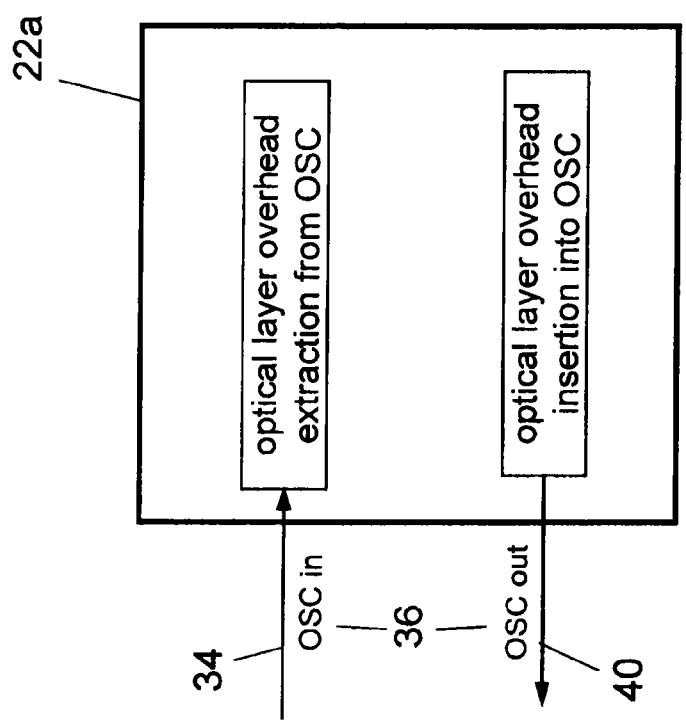
FIG. 2 is an illustration of interaction of an exemplary optical node in the optical transport network with an optical signal on an optical supervisory channel.

As illustrated in FIG. 2, an exemplary optical node 22a, such as an optical add/drop multiplexer (OADM) or a reconfigurable optical add/drop multiplexer (ROADM), in the optical transport network 20, may receive an optical signal 34 containing information regarding the Operation, Administration, and/or Maintenance (OAM) of optical layers in the optical transport network 20. The signal 34 may be carried via an optical supervisory channel 36 (OSC), or any suitable optical channel. The optical node 22a may extract the OAM information from the OSC 36. The optical node 22a may also insert OAM information into the OSC 36.

Figure 3:
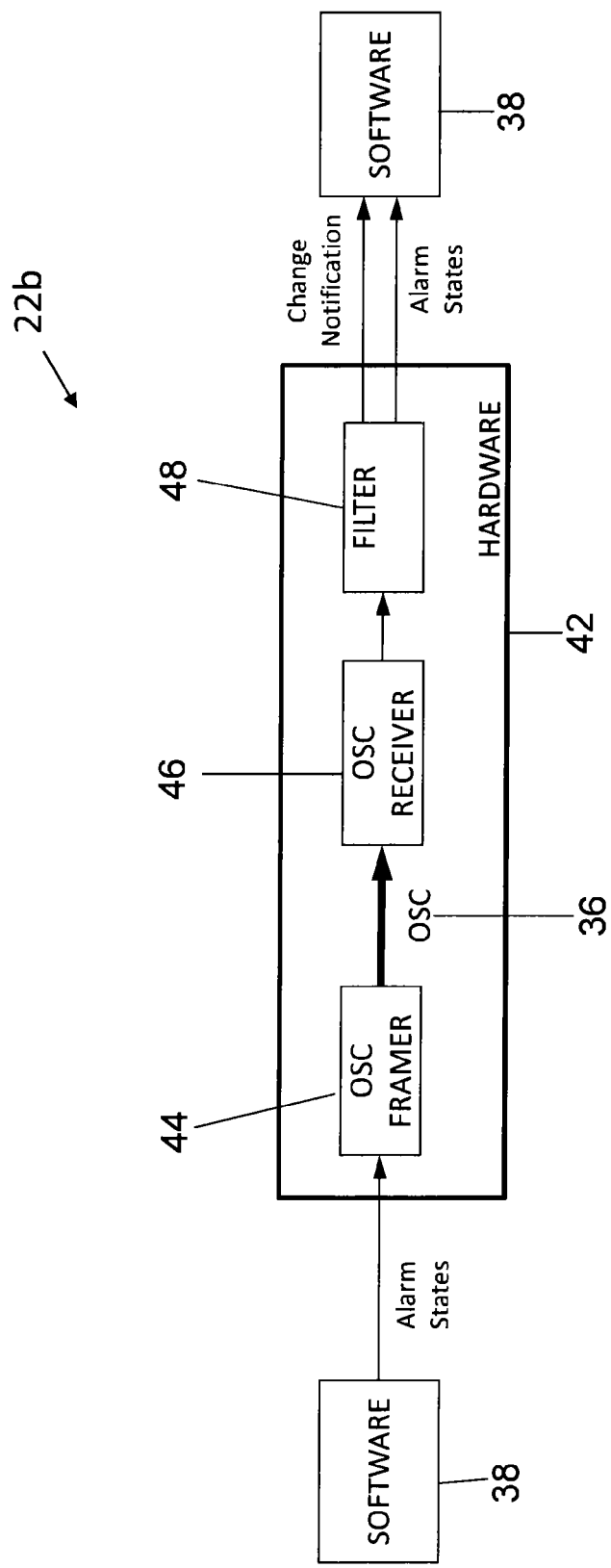
FIG. 3 is a schematic illustration of software and hardware in an exemplary node.

As illustrated in FIG. 3, the signal 34 is terminated at the optical node 22b, where the optical node 22b extracts the optical layer overhead OAM information from the signal 34 in the OSC 36. The optical node 22b may then notify software 38 in the optical transport network 20 of the status of the optical layer, as indicated by the overhead information. In one embodiment, the optical node 22b inspects the signal 34 for stable values before notifying the software of the status of the optical layer. The filtering for stable values may be done in hardware, in which case, the association of filtering characteristics to fields may be fixed in the hardware code, for example, in a FPGA's code. Also, if granular notifications (interrupts) are provided to software, the association of fields to interrupt bits may be fixed in the hardware code.

Additionally, the optical node 22b may write, with the software or with hardware, Operation, Administration, and/ or Maintenance (OAM) information of the optical layers in the optical transport network 20 into overhead of a second signal 40. This information may include equipment status, incoming signal status, and/or connectivity information. Of course, the information may include any OAM information. The optical node 22b may then initiate, with the software, transmission of the second signal 40 via the optical supervisory channel 36, or any suitable optical channel.

The nodes 22 within the optical transport network 20 contains circuitry 42 adapted to receive the optical signal 34. The circuitry 42 is adapted for wavelength multiplexing and wavelength switching. For example, the circuitry 42 may include an Optical Add/Drop Multiplexer (OADM), or a Reconfigurable Optical Add/Drop Multiplexer (ROADM). Other examples of circuitry 42 include field replaceable units (FRUs), and semiconductor devices such as gate arrays or field programmable gate arrays (FPGAs). Of course, any other hardware may be used that is adequate to receive and interpret the optical signal 34.

In one embodiment, as illustrated in FIG. 3, the circuitry 42 of the optical node 22b may include an optical supervisory channel (OSC) framer 44, an optical supervisory channel (OSC) receiver 46, and a filter 48. The operation of the OSC framer 44 and OSC receiver 46 are well known in the art and therefore will not be further explained herein. As for the filter 48, since the OSC 36 is not Forward Error Correction encoded, random bit errors may be present. The filter 48 is adapted to prevent isolated bit errors from generating spurious data to the software 38. The filter 48 notifies the software 38 of the status of the optical layer in the optical node 22b only when the information has been stable for a defined number of frames, or for a defined number of times within a frame. For example, the filter 48 may notify the software 38 of the information if the information repeats for two frames. In another example, the filter 48 may notify the software 38 of the information if the information repeats for three frames, or any number indicating that the information is stable. In another example, the filter 48 may notify the software of the information if the information repeats for at least three times within a frame, or any number of times indicating that the information is stable.

The optical supervisory channel 36 (OSC) may utilize a Synchronous Transport Signal (STS) Optical Carrier transmission rate OC-3. Alternatively, the OSC 36 may utilize a concatenated Optical Carrier transmission rate OC-3c. Alternately, the OSC 36 may utilize an Optical Carrier transmission rate OC-N, such as OC-3, OC-12, OC-48, OC-192, or OC-768, or any suitable OC-N. Optical Carrier transmission rates are a standardized set of specifications of transmission bandwidth for digital signals that can be carried on fiber optic networks. OC-3 can have an optical carrier transmission rate of up to 155.52 megabits per second. The OC-3 frame contains three column-interleaved Synchronous Transport Signal Level 1 (STS-1) frames.

The STS-1 frames have a designated frame format including a transport overhead portion with a Line portion 54, as illustrated in FIG. 4. The Line portion 54 of the transport overhead portion contains six rows and three columns. Each of the boxes in the illustration represents one byte. Since the OC-3 frame contains three column-interleaved STS-1 frames, the line overhead of OC-3 frame consists of an array of six rows by nine columns (that is, fifty-four bytes). The OC-3 and STS frame format is further defined in Telecordia's Generic Requirements GR-253, "Synchronous Optical Network (SONET) Transport Systems Common Generic Criteria," Issue 4.

Within the Line portion 54, bytes in STS-1 frame portion 56 designated as D4, D5, D6, D7, D8, D9, D10, D11, and D12 are defined by GR-253 for use by Data Communication Channel (DCC). However, these bytes can instead be designated to carry OAM overhead for the optical layers in the optical transport network 20.

Figure 5:
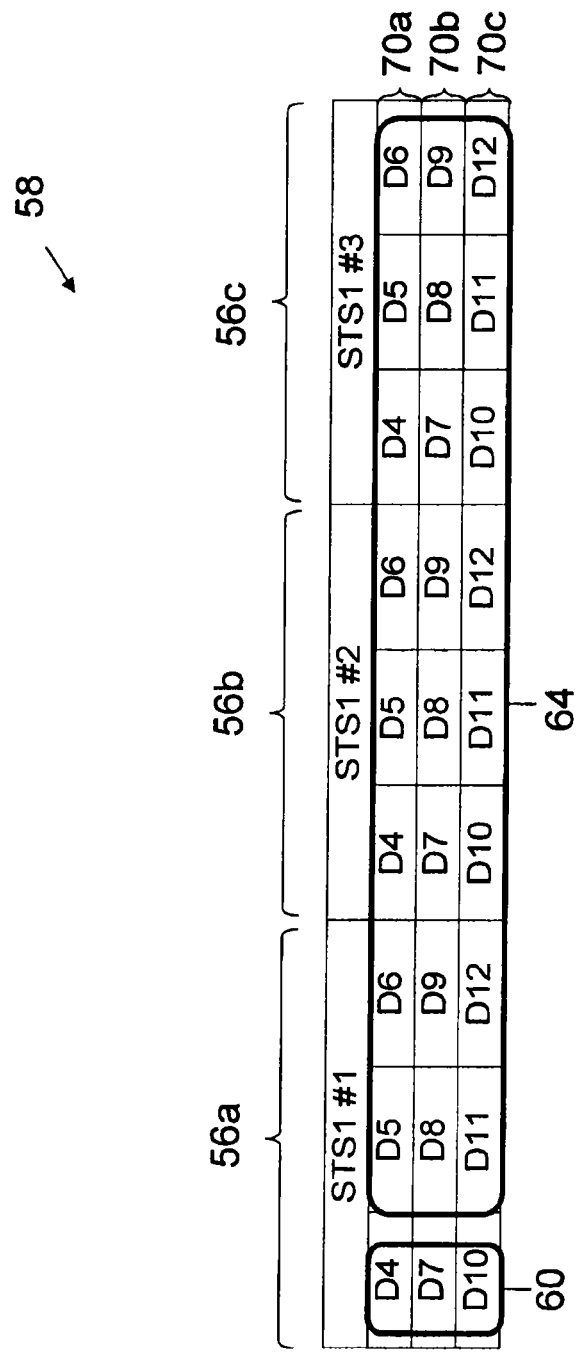
FIG. 5 is an illustration of overhead bytes of an OC-3 frame.

FIG. 5 is an illustration of a portion 58 of an OC-3 frame, displaying overhead bytes D4 through D12 for a first STS-1 frame portion 56a, a second STS-1 frame portion 56b, and a third STS-1 frame portion 56c.

OAM information for the optical layers, OTS, OMS, and OCh/Super Channel, may be assigned to defined overhead fields with a defined number of bits. The overhead fields and bits may be assigned to defined bytes in the STS-1 frames of the OC-N. The assignment of OAM bits to bytes within the Line portion 54 of the synchronous transport signal frame format within the OC-N frame format may be carried out by software or by code in hardware of the optical node 22.

Together, overhead bytes D4, D7 and D10, of the first STS-1 frame portion 56a in the OC-N frame, are referred to as the Multi-frame & Alarm Bits Area 60. The Multi-frame & Alarm Bits Area 60 is associated with the bit-field multi-frame 62, as illustrated in FIG. 6. The Multi-frame & Alarm Bits Area 60 may be used to carry designated alarm-bits 61 (not shown) for OTS, OMS, and OCH/Super Channel layers, as will be further described herein, including in FIGS. 9 through 14.

FIG. 6 is an illustration of an exemplary Multi-frame & Alarm Bits Area 60. As illustrated in FIG. 6, one byte within the Multi-frame & Alarm Bits Area 60 may be assigned by software to each monitored entity, and one bit within the Multi-frame & Alarm Bits Area 60 may be allocated for each alarm (for example, alarm-bit #3 allocated for PMI). Additionally, for consistency, the overhead byte D7 and overhead byte D10 may carry the same information as is carried in the D4 overhead byte. For example, if frame #45 within the bit-field multi-frame 62 is assigned by software to OCh #42, then overhead bytes D4, D7, and D10 carry identical eight-bit values corresponding to the OCh #42 alarm state. In one embodiment, for a new value to be accepted, three consecutive, identical values must be received, otherwise, the old value persists until the next frame. Therefore, the latency, assuming no bit errors is twenty-seven msec. maximum (that is, 216 multiplied by 0.125). It should be understood that any number of repetitive values may be used to establish that a signal value is stable.

Referring again to FIG. 5, the remainder of the bytes in the illustrated portion 58 of the OC-3 frame may be reserved for Trail Trace Identifier (TTI) information. This area is referred to as the TTI Fields Area 64 and comprises the first STS-1 frame portion 56a overhead bytes D5, D6, D8, D9, D11, D12; the second STS-1 frame portion 56b overhead bytes D4 through D12; and the third STS-1 frame portion 56c overhead bytes D4 through D12. A TTI group 70 is comprised of eight bytes. For example, an eight-byte TTI group 70a is comprised of the eight bytes beginning with the first STS-1 frame portion 56a overhead bytes D5 and D6, the second STS-1 frame portion 56b overhead bytes D4-D6, and the third STS-1 frame portion 56c overhead bytes D4-D6. For example, another eight-byte TTI group 70b is comprised of the eight bytes beginning with the first STS-1 frame portion 56a overhead bytes D8 and D9, the second STS-1 frame portion 56b overhead bytes D7-D9, and the third STS-1 frame portion 56c overhead bytes D7-D9. For example, another eight-byte TTI group 70c is comprised of the eight bytes beginning with overhead byte D11 and D12, the second STS-1 frame portion 56b overhead bytes D10-D12, and the third STS-1 frame portion 56c overhead bytes D10-D12, and so on.

Figure 8:
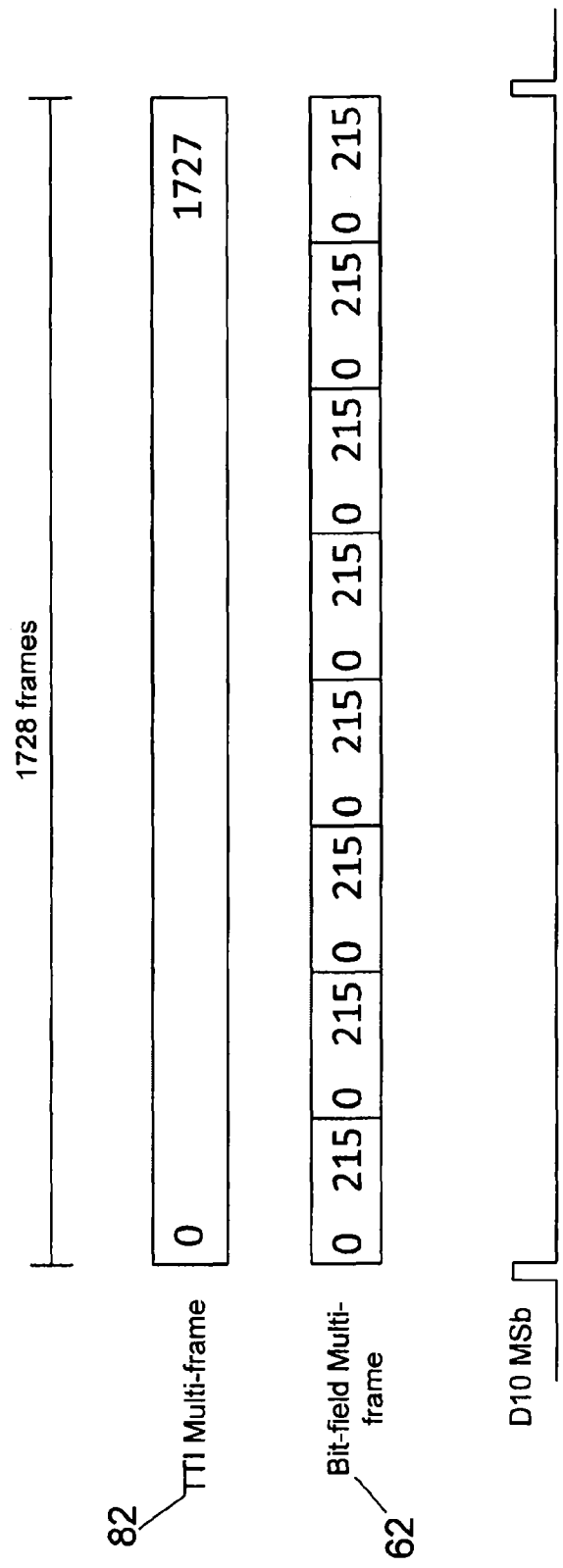
FIG. 8 is an illustration of the alarm and TTI multi-frame.

As illustrated in FIG. 7, eight consecutive eight-byte TTI groups 70 make one TTI message 80 of sixty-four bytes. For example TTI groups 70a through 70h (not shown) make up a first TTI message 80a. The first TTI message 80a is aligned to the start of the TTI multi-frame 82. Each TTI message 80 programmed by software may be repeated three consecutive times for a total of 192 bytes, illustrated for example as 80a, 80b, and 80c. Since there are 1728×24 bytes in the TTI Multi-frame 82, this provides space for 216 TTI messages 80, each with three repetitions, as illustrated in FIG. 7 and FIG. 8. In one embodiment, the three consecutive TTI messages 80a, 80b, and 80c, for example, must be identical in order for the TTI message 80 to be accepted; otherwise the old value persists until the next TTI multi-frame 82. TTI messages 80 will not always be aligned to the frame, since the sixty-four byte size of the TTI messages 80 are not a multiple of the twenty-four byte length of the TTI Fields Area 64. However, the TTI messages 80 are aligned to the eight-byte TTI groups 70. Assuming no bit errors, the worst-case latency is 216 msec (that is, 1728 multiplied by 0.125).

Software initiates the transmission of the signal 40 by writing the intended alarm-bits 61 and/or TTI message 80 to the designated place in the address map of the OC-N frame. The access can be automatic such that the sixty-four byte TTI message 80 is transferred automatically to hardware on a TTI message boundary, which prevents a partially updated message from being transmitted. In one embodiment, when three consecutive identical values of the alarm-bit 61 field or TTI message 80 field are received, the value is transferred to a software-accessible memory map location. An interrupt to software may be generated at the receiver for each byte in the alarm-bit 61 field that changes (after filtering) and for each message in the TTI message 80 field that changes (after filtering). No interrupt would be generated if the byte in the alarm-bit 61 field or the message in the TTI message 80 field is not consistent for three consecutive frames or times. A hierarchical structure (tree) can be provided such that the changed bytes or messages can be isolated by software using the minimum number of reads. Since the three repeated values are consecutive, multiple copies of the received values for all alarm-bit 61 fields and TTI message 80 fields are not necessary. One copy of the received values of the alarm-bit 61 fields and TTI message 80 fields for the transmitter and one copy of the received values of the alarm-bit 61 fields and TTI message 80 fields for the receiver may be stored, which would require 432 bytes (that is, 216 multiplied by 2 copies) for the alarm-bit 61 fields and 27648 bytes (that is, 216 multiplied by 64 multiplied by 2 copies) for the TTI message 80 fields. It should be understood that the number of consecutive identical values of the alarm-bit 61 field or TTI message 80 field received before transfer to the software-accessible memory map location may be designated as more or less than three.

As illustrated in FIG. 8, a 1728-frame TTI multi-frame 82 (216 msec) is defined by the MSb of D10. This bit is high at frame 1727 (the last frame in the multi-frame) and low otherwise. A 216-frame bit-field multi-frame 62 (27 msec) is also locked to the MSb of overhead byte D4 such that a sequence of eight bit-field multi-frames 62 is aligned to one TTI multi-frame 82. The TTI Fields Area 64 is associated with the TTI Multi-frame 82.

Referring now to FIG. 9, in one embodiment, the OAM information regarding the optical transmission section (OTS) layer of the optical transport network 20 is assigned to multiple alarm bits 61 and TTI bits, including the following:

a one-bit Backward Defect Indication Payload (BDI-P) alarm bit field 102 used for section monitoring backward defect indication for OTS payload signal failure status, a one-bit Backward Defect Indication Overhead (BDI-O) alarm bit field 104 used for backward defect indication for OTS overhead signal failure status, a one-bit Payload Missing Indicator (PMI) alarm bit field 106 used to suppress Loss of Signal, and an eight-bit Optical Transmission Section Trail Trace Identifier (OTS TTI) field 108 (used with the sixty-four byte string (multi-frame) starting in the first frame of an OC-N multi-frame).

The OTS layer fields may be assigned to the first frame of the OC-N multi-frame. The OTS layer BDI-P alarm bit field 102, BDI-O alarm bit field 104, and the PMI alarm bit field 106 may be assigned to the overhead byte D4 of the first STS-1 frame portion 56a overhead of the Multi-frame & Alarm Bits Area 60. The overhead byte D7 and overhead byte D10 of the first STS-1 frame portion 56a overhead of the Multi-frame & Alarm Bits Area 60 may carry the same information as is carried in the overhead byte D4. The OTS TTI field 108 may be assigned to the TTI Fields Area 64 described above. The OTS TTI sixty-four byte strings may be assigned to the first 8×OC-N frames. As described previously, eight bytes are available per OC-N frame, therefore, eight OC-N frames may be used to transmit the sixty-four byte TTI message 80.

Figure 10:
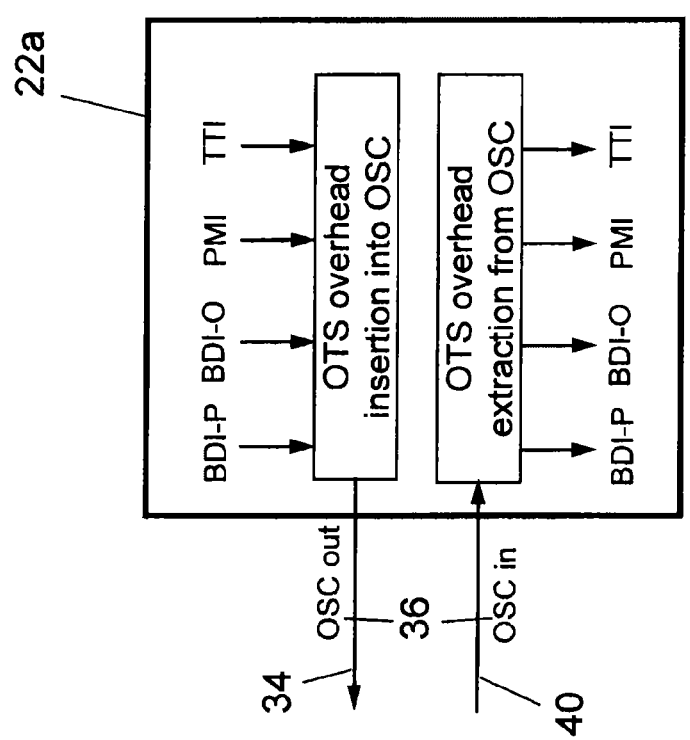
FIG. 10 is an illustration of the insertion and extraction of OTS OAM bits to/from an optical supervisory channel.

FIG. 10 illustrates the extraction and insertion of OAM information from the OTS layer fields in the overhead bytes of the optical supervisory channel 36. An exemplary optical node 22a, such as an optical add/drop multiplexer (OADM), in the optical transport network 20, may receive an optical signal 34 via the optical supervisory channel (OSC) 36 containing the OTS layer fields, such as the OTS BDI-P alarm bit field 102, BDI-O alarm bit field 104, PMI alarm bit field 106 and the OTS TTI field 108. The signal 34 is terminated at the optical node 22a, where the optical node 22a extracts the OTS layer fields overhead information from the signal 34 in the OSC 36. The optical node 22a may then notify software 38 in the optical transport network 20 of the status of the optical layer, as indicated by the overhead information. In one embodiment, the optical node 22*a* inspects the signal 34 for stable values before notifying the software 38 of the status of the optical layer. The filtering for stable values may be done in hardware, in which case, the association of filtering characteristics to fields may be fixed in the hardware code, for example, in a FPGA's code. Also, if granular notifications (interrupts) are provided to software, the association of fields to interrupt bits may be fixed in the hardware code.

Additionally, the optical node 22*a* may write, with the software or with hardware, Operation, Administration, and/or Maintenance (OAM) information of the OTS layer into the OTS layer fields such as the OTS BDI-P alarm bit field 102, BDI-O alarm bit field 104, PMI alarm bit field 106 and the OTS TTI field 108, of a second signal 40. Of course, the information may include any OAM information. The optical node 22*a* may then initiate, with the software, transmission of the second signal 40 via the optical supervisory channel 36, or any suitable optical channel.

Referring now to FIG. 11, in one embodiment, the OAM information regarding the optical multiplex section (OMS) layer is assigned to multiple alarm bits 61, including the following:

a one-bit Backward Defect Indication Payload (BDI-P) alarm bit field 110 used for OMS section monitoring backward defect indication for OMS payload signal failure status, a one-bit Backward Defect Indication Overhead (BDI-O) alarm bit field 112 used for backward defect indication for OMS overhead signal failure status, a two-bit Payload Missing Indicator/Forward Defect Indication Payload (PMI/FDI-P) alarm bit field 114 used to indicate status. PMI is a downstream indication and PMI may be used to suppress of Loss of Signal when no OCh is present. When there are no connections present on a link 30 (that is, there are no OCh) an upstream node indicates the lack of connections via OAM such that a downstream node is notified that there are no connections setup yet in the upstream. The PMI may be used by the downstream node to suppress OMS layer alarms. FDI-P is used to convey status (normal or failure) of a payload signal in a downstream direction.

and a one-bit Forward Defect Indication Overhead (FDI-O) alarm bit field 116 used to convey status (normal or failure) of an overhead signal in a downstream direction.

The OMS layer fields may be assigned to the second frame of the OC-N multi-frame. The OMS layer BDI-P alarm bit field 110, BDI-O alarm bit field 112, PMI/FDI-P alarm bit field 114, and FDI-O alarm bit field 116, may be assigned to the overhead byte D4 of the first STS-1 frame portion 56*a* overhead of the Multi-frame & Alarm Bits Area 60. The overhead byte D7 and overhead byte D10 of the first STS-1 frame portion 56*a* overhead of the Multi-frame & Alarm Bits Area 60 may carry the same information as is carried in the overhead byte D4.

Figure 12:
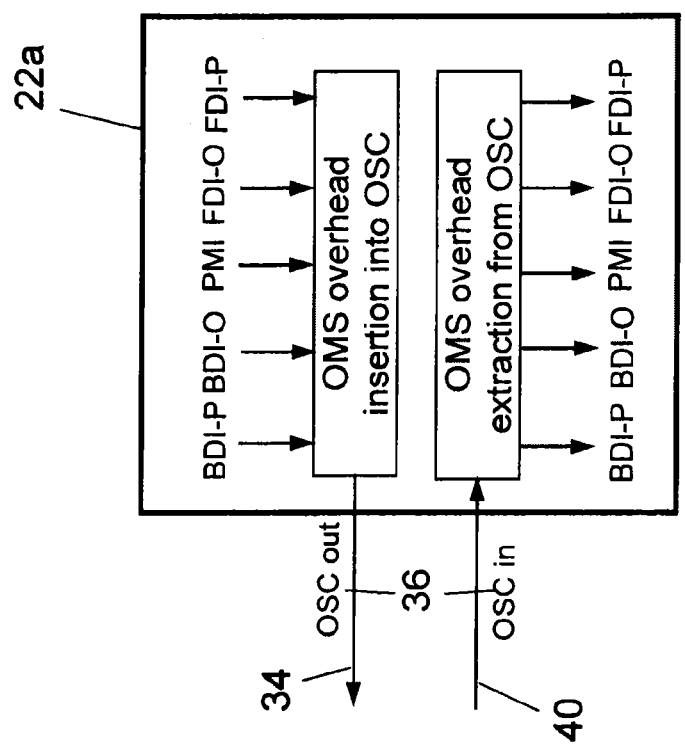
FIG. 12 is an illustration of the insertion and extraction of OMS OAM bits to/from optical supervisory channel.

FIG. 12 illustrates the extraction and insertion of OAM information from the OMS layer fields in the overhead bytes of the optical supervisory channel 36. An exemplary optical node 22*a*, such as an optical add/drop multiplexer (OADM), in the optical transport network 20, may receive an optical signal 34 via the optical supervisory channel (OSC) 36 containing the OMS layer fields, such as the OMS layer BDI-P alarm bit field 110, BDI-O alarm bit field 112, PMI/FDI-P alarm bit field 114, and FDI-O alarm bit field 116. The signal 34 is terminated at the optical node 22*a*, where the optical node 22*a* extracts the OMS layer fields overhead information from the signal 34 in the OSC 36. The optical node 22*a* may then notify software 38 in the optical transport network 20 of the status of the optical layer, as indicated by the overhead information. In one embodiment, the optical node 22*a* inspects the signal 34 for stable values before notifying the software 38 of the status of the optical layer. The filtering for stable values may be done in hardware, in which case, the association of filtering characteristics to fields may be fixed in the hardware code, for example, in a FPGA's code. Also, if granular notifications (interrupts) are provided to software, the association of fields to interrupt bits may be fixed in the hardware code.

Additionally, the optical node 22*a* may write, with the software or with hardware, Operation, Administration, and/or Maintenance (OAM) information of the OMS layer into the OMS layer fields such as the OMS BDI-P alarm bit field 110, BDI-O alarm bit field 112, PMI/FDI-P alarm bit field 114, and FDI-O alarm bit field 116, of a second signal 40. Of course, the information may include any OAM information. The optical node 22*a* may then initiate, with the software, transmission of the second signal 40 via the optical supervisory channel 36, or any suitable optical channel.

Referring now to FIG. 13, in one embodiment, the OAM information regarding one or more optical channel (OCh) layers or Super Channels (OCh) is assigned to multiple alarm bits 61 and TTI bits, including the following:

a one-bit Forward Defect Indication Overhead (FDI-O) alarm bit field 120 used to convey status (normal or failure) of an overhead signal in a forward direction;

a two-bit Forward Defect Indication Payload/Open Connection Indication (FDI-P/OCI) alarm bit field 122 used to indicate status, where the FDI-P indicates payload signal status (failed) in a forward direction and where the OCI is sent downstream when a connection is removed locally;

a one-bit Backward Defect Indication Payload (BDI-P) alarm bit field 124 used for restoration in unidirectional failure situation, a one-bit Client Signal Failure (CSF) alarm bit field 126 used to isolate client failures from network failures, and an eight-bit Optical Channel layer or SCh Trail Trace Identifier (OCh TTI) field 128 (used in the sixty-four byte string (multi-frame) in the OC-N multi-frame).

The OCh layer or SCh fields may be assigned to the third frame through the 215th frame of the OC-N multi-frame, as illustrated in FIGS. 6 and 8. The OCh layer FDI-O alarm bit field 120, FDI-P/OCI alarm bit field 122, BDI-P alarm bit field 124, and CSF alarm bit field 126 may be assigned to the overhead byte D4 of the first STS-1 frame portion 56*a* overhead of the Multi-frame & Alarm Bits Area 60. The overhead byte D7 and overhead byte D10 of the first STS-1 frame portion 56*a* overhead of the Multi-frame & Alarm Bits Area 60 may carry the same information as is carried in the overhead byte D4. The OCh TTI field 128 may be assigned to the TTI Fields Area 64 described above. The OCh TTI sixty-four byte strings may be assigned to the 8×OC-N frames. As described previously, eight bytes are available per OC-N frame, therefore, eight OC-N frames may be used to transmit the sixty-four byte TTI message 80. The 8×bytes are shared by up to 96×OCh layers using multi-frame identification.

Figure 14:
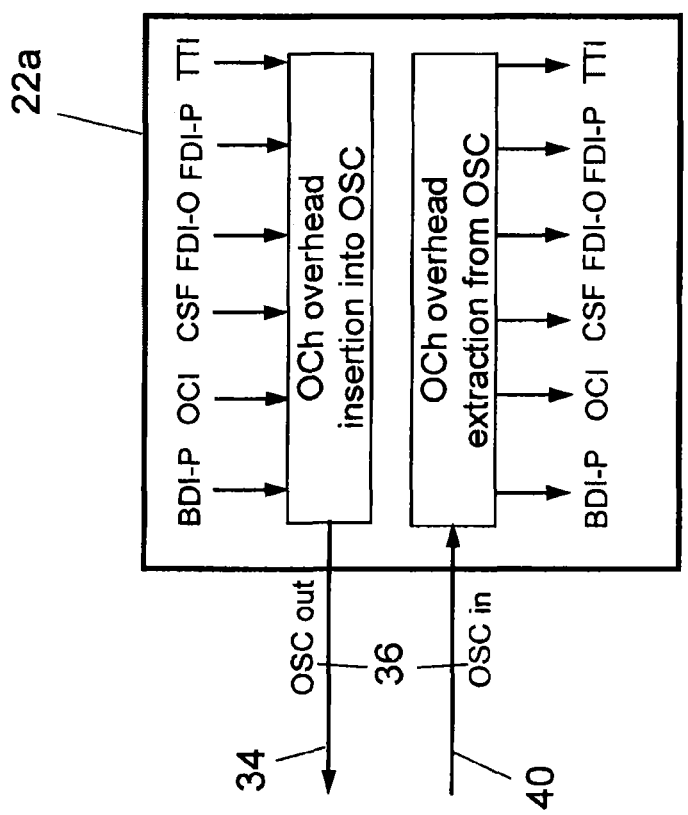
FIG. 14 is an illustration of the insertion and extraction of optical channels (OCh) or Super Channels (SCh) OAM bits to/from an optical supervisory channel.

FIG. 14 illustrates the extraction and insertion of OAM information from the OCh layer or SCh fields in the overhead bytes of the optical supervisory channel. An exemplary optical node 22*a*, such as an optical add/drop multiplexer (OADM), in the optical transport network 20, may receive an optical signal 34 via the optical supervisory channel (OSC) 36 containing the OCh layer fields, such as the OCh or SCh layer FDI-O alarm bit field 120, FDI-P/OCI field alarm bit field 122, BDI-P alarm bit field 124, CSF alarm bit field 126 and the OCh TTI field 128. The signal 34 is terminated at the optical node 22a, where the optical node 22a extracts the OCh layer fields overhead information from the signal 34 in the OSC 36. The optical node 22a may then notify software 38 in the optical transport network 20 of the status of the optical layer, as indicated by the overhead information. In one embodiment, the optical node 22a inspects the signal 34 for stable values before notifying the software 38 of the status of the optical layer. The filtering for stable values may be done in hardware, in which case, the association of filtering characteristics to fields may be fixed in the hardware code, for example, in a FPGA's code. Also, if granular notifications (interrupts) are provided to software, the association of fields to interrupt bits may be fixed in the hardware code.

Additionally, the optical node 22a may write, with the software or with hardware, Operation, Administration, and/or Maintenance (OAM) information of the OCh layer or SCh into the OCh layer or SCh fields such as the OCh layer or SCh FDI-O alarm bit field 120, FDI-P/OCI alarm bit field 122, BDI-P alarm bit field 124, CSF alarm bit field 126 and the OCh TTI field 128, of a second signal 40. Of course, the information may include any OAM information. The optical node 22a may then initiate, with the software, transmission of the second signal 40 via the optical supervisory channel 36, or any suitable optical channel.

The following table summarizes the above described exemplary assignment of overhead alarm bits 61 and TTI messages 80 per optical layer:

| Layer | Number of Instances | Defined Alarm Bits | TTI Messages per | Total TTI Messages | |
|---|---|---|---|---|---|
| OTS | 1 | 3 | 1 | 1 | |
| OMS | 2 | 5 | 1 | 2 | L band is reserved |
| OCh/SuperChannels | 96 | 6 | 1 | 96 | |
| TCM OCh | 96 | 0 | 1 | 96 | |
| Totals | 195 | | | 195 | |

Figure 15:
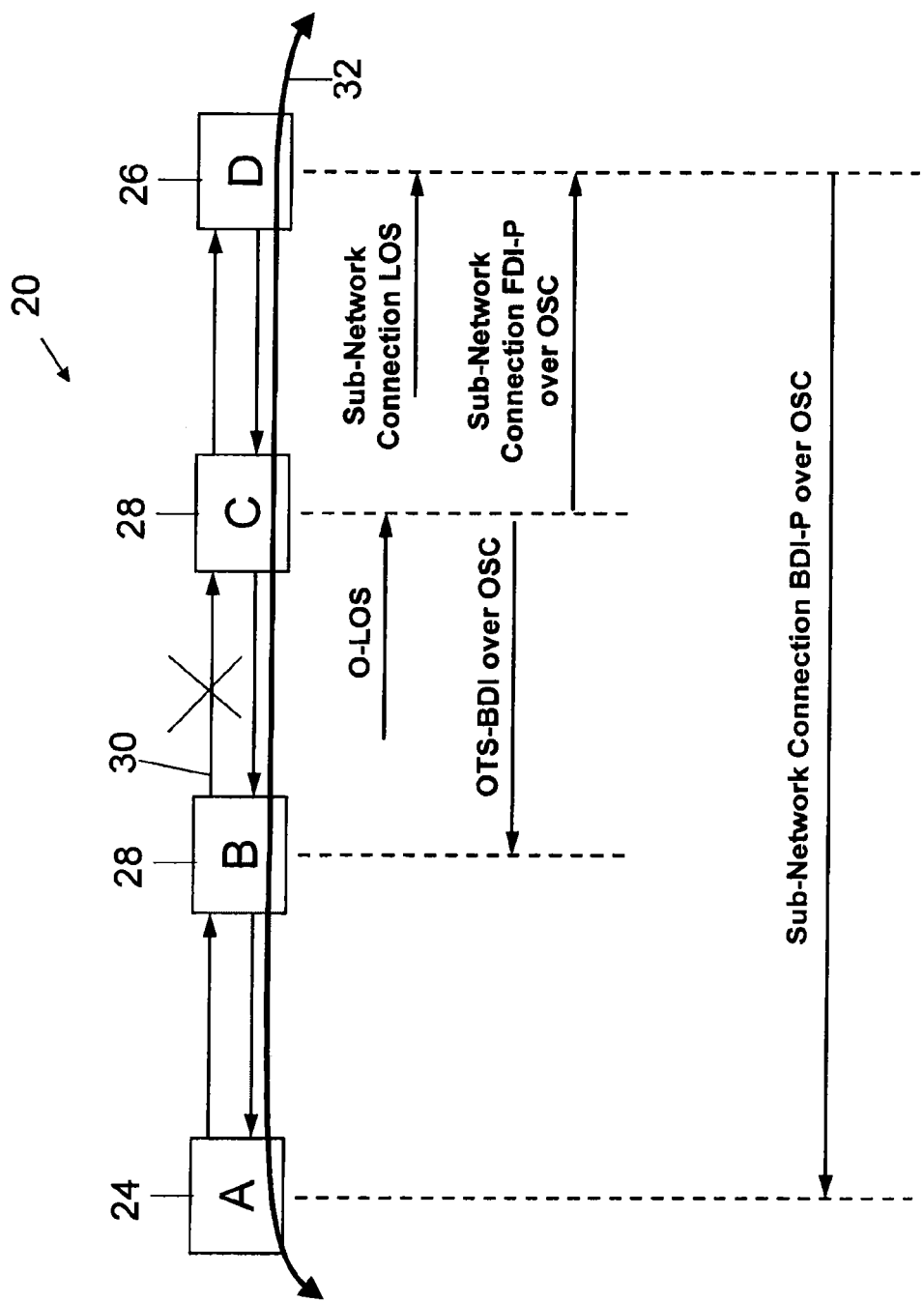
FIG. 15 is an illustration of an exemplary optical transport network in which a unidirectional failure has occurred.

FIG. 15 illustrates an exemplary optical transport network 20 utilizing the above described assignment of overhead information to defined overhead fields with a defined number of bits, where the overhead fields and bits are assigned to defined bytes in the STS-1 frames of the OC-N. In this example, a unidirectional failure has occurred in the intermediate link 30 between intermediate node 28 B and intermediate node 28 C. The OTS layer and the OMS layer failures are translated and communicated over the OSC 36 utilizing the established defined bytes. Intermediate node 28 C translates OTS layer overhead loss of signal (LOS) to Super Channel (SCh) failure indication or optical channel (OCh) failure indication, and sends a FDI-P indication towards tailend node 26 D. Tailend node 26 D translates super channel failures (that is, loss of signal and FDI) to BDI-P indication directed to connection headend node 24 A. Intermediate node 28 C and intermediate node 28 B forward per-channel failure indication to headend node 24 A based on connection information. The headend node 24 A then may use received failure indications to perform connection restoration. For example, the BDI-P alarm bits in the overhead bytes D4, D7, and D10, may be used by headend node 24 A to alarm locally against the sub-network connection (SNC). Additionally, if headend node 24 A is configured for restoration, headend node 24 A may use the BDI-P alarm bits as a trigger to perform restoration.

Figure 16:
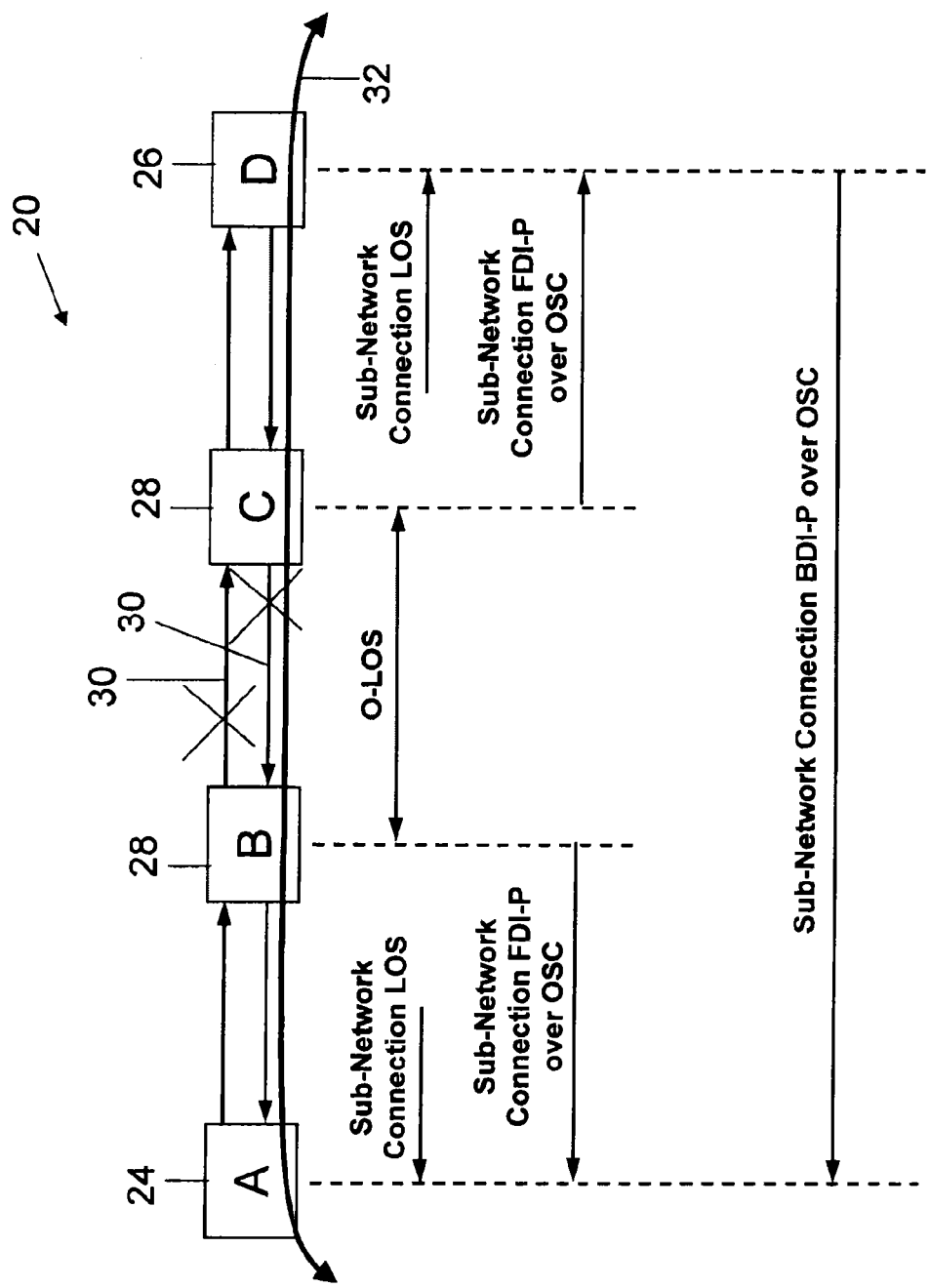
FIG. 16 is an illustration of an exemplary optical transport network in which a bidirectional failure has occurred.

FIG. 16 illustrates an exemplary optical transport network 20 utilizing the above described assignment of overhead information to defined overhead fields with a defined number of bits where the overhead fields and bits are assigned to defined bytes in the STS-1 frames of the OC-N. In this example, a bidirectional failure has occurred. FDI-P is based on connectivity information. The failure indication is directed to the headend of the connection, in this example, headend node 24 A. Each node 22 forwards the OCh layer failure forward or backward based on the configured information. OCh status may be derived based on connectivity information.

Figure 17:
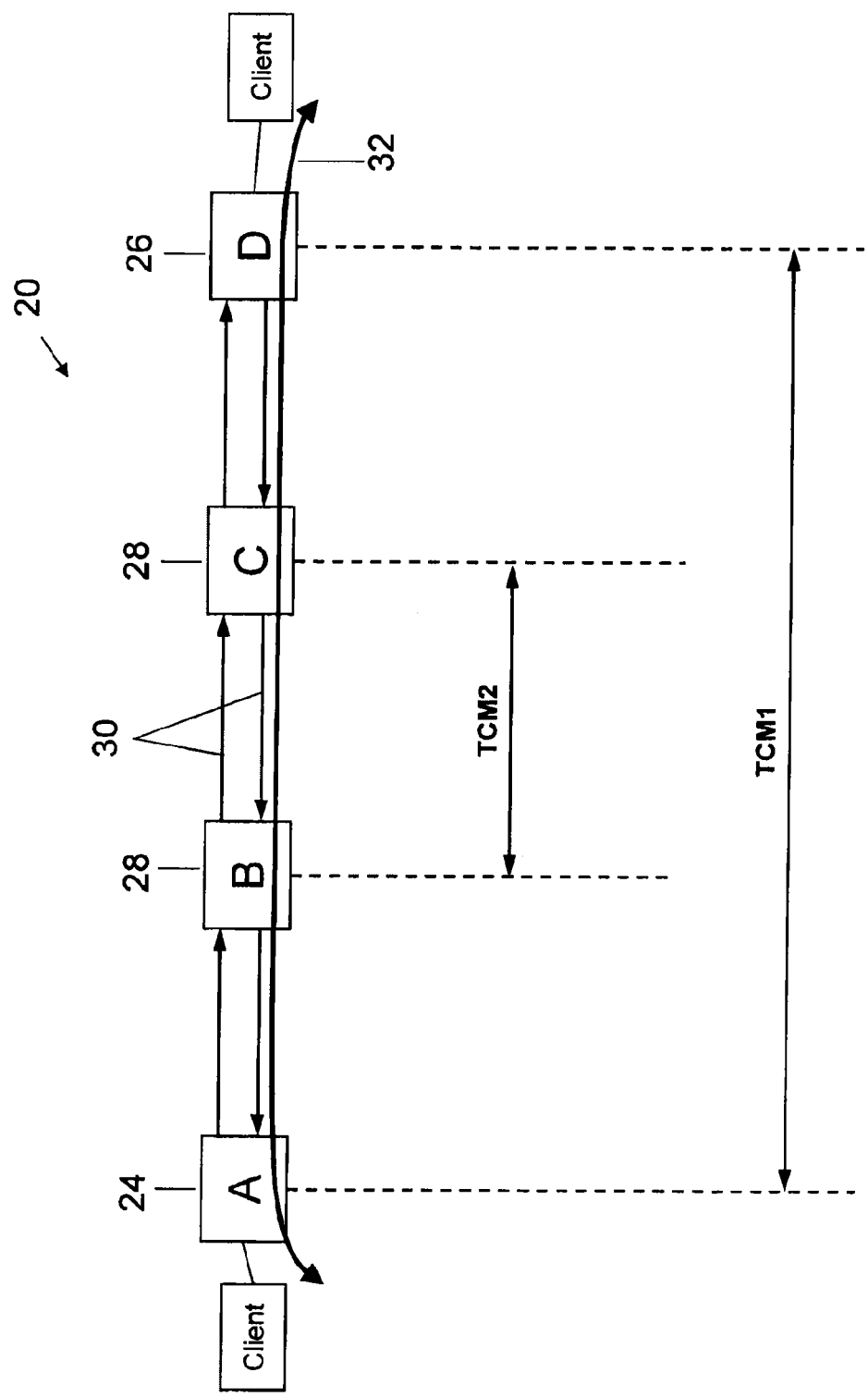
FIG. 17 is an illustration of an exemplary optical transport network with tandem connection monitoring (TCM) of the sub-network connection (SNC) utilizing the OC overhead for OAM.

FIG. 17 illustrates an exemplary optical transport network 20 with tandem connection monitoring (TCM) of the sub-network connection (SNC) 32 utilizing the OAM assignments described above. TCM1 is created from headend node 24 A to tailend node 26 D on the SNC 32. TCM2 is created between intermediate node 28 B and intermediate node 28 C for the same SNC 32 as TCM1. TCM1 can be used for restoration purposes. TCM2 can be used for segment monitoring and fault isolation purposes.

CONCLUSION

Currently, ITU-T recommendation G.872 specifies defects for the OTS, OMS, and OCh layers as well as specifying Operation, Administration & Maintenance (OAM) requirements; however, there are no mechanisms or protocols defined to carry OAM information for the optical layers over an optical channel. In accordance with the present disclosure, methods and apparatus are described for mapping optical layer overhead information to specific overhead bits and assigning the overhead bits to specific OSC OC-N overhead bytes.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

In addition, information regarding the optical channel (OCh) or Super Channel (SCh) label switched paths can be stored and processed in a distributed fashion, or in a centralized fashion. The frequency slot information can be stored in a distributed fashion (distributed storage having multiple memory/storage devices) and processed in a distributed manner preferably by using a hop-to-hop processing. In another implementation, the distributed storage may be replaced by a centralized memory that stores the frequency slot information for all, or a subset, of the nodes. In this situation, the nodes may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

[G.709] ITU-T Recommendation G.709 "Interfaces for the optical transport network (OTN)." December 2009.

[G.872] ITU-T Recommendation G.872, "Architecture of optical transport networks", November 2001.

[G.805] ITU-T Recommendation G.805, "Generic functional architecture of transport networks", March 2000.

[G.694.1] ITU-T Recommendation G.694.1, "Spectral grids for WDM applications: DWDM frequency grid", June 2002.

[GR-253] Telecordia's Generic Requirements GR-253, "Synchronous Optical Network (SONET) Transport Systems: Common Generic Criteria," Issue 4, December 2005.

[RFC 3945] Mannie, E., "Generalized Multi-Protocol Label Switching (GMPLS) Architecture", RFC 3945, The Internet Society, October 2004.

What is claimed is:

1. A method comprising the steps of:
receiving, by circuitry of an optical node adapted for wavelength multiplexing and wavelength switching, a signal over an optical control channel, the signal conforms to an optical carrier (OC-N) frame format, and the signal includes a transport overhead portion of a synchronous transport signal frame format, the transport overhead portion including D4-D12 bytes, a first one of the D4-D12 bytes including first bits of a Backward Defect Indication Payload field, second bits of a Backward Defect Indication Overhead field, and third bits of a Payload Missing Indicator field, the first bits, the second bits, and the third bits being indicative of a status of an optical layer in an optical transport network, a second one of the D4-D12 bytes including the first bits, the second bits, and the third bits, and a third one of the D4-D12 bytes carrying the first bits, the second bits, and the third bits;
receiving, with the interfaces, wavelength division multiplexed optical signals;
wherein the optical carrier frame format comprising a first synchronous transport signal frame, a second synchronous transport signal frame, and a third synchronous transport signal frame, the synchronous transport signal frames having a synchronous transport signal frame format;
wherein the
terminating, by circuitry of the optical node, the signal at the optical node; and
notifying, by circuitry of the optical node, software of the status of the optical layer in the optical transport network based on at least one of the D4-D12 bytes.

2. The method of claim 1, wherein the optical carrier (OC-N) frame format is concatenated (OC-3c).

3. The method of claim 1, wherein the OC-N frame format conforms to rules set forth in GR-253.

4. The method of claim 1, further comprising:
inspecting, by circuitry of the node, the signal for stable values.

5. The method of claim 1, wherein the signal is a first signal, the method further comprising the steps of:
writing, with the software, the status of the optical layer in the optical transport network into a second signal comprising a second overhead; and
initiating, with the software, transmission of the second signal.

6. The method of claim 5, wherein the status is indicative of at least one of equipment status, incoming signal status, and connectivity information.

7. The method of claim 1, wherein the circuitry of the optical node comprises an optical supervisory channel framer, an optical supervisory receiver, and a filter, wherein the filter notifies the software of the status of the optical layer in the optical transport network.

8. The method of claim 1, wherein the optical layer is an optical transmission section layer.

9. The method of claim 1, wherein the Backward Defect Indication Payload field is a one-bit field, the Backward Defect Indication Overhead field is a one-bit field, the Payload Missing Indicator field is a one-bit field, and
one of the D4-D12 bytes includes a Optical Transmission Section Trail Trace Identifier field is an eight-bits field.

10. The method of claim 9, wherein the the first byte is byte D4;
wherein the second and third bytes are bytes D7 and D10 byte, respectively; and
wherein the Optical Transmission Section Trail Trace Identifier field comprises eight-byte groups carried within bytes D5, D6, D8, D9, D11, D12, and in the second synchronous signal frame overhead bytes, and in the third synchronous transport overhead bytes.

11. The method of claim 1, wherein the optical layer is an optical multiplex section layer.

12. The method of claim 11, the Backward Defect Indication Payload field is a first Backward Defect Indication Payload field, the Backward Defect Indication Overhead field is a first Backward Defect Indication Overhead field, and the Payload Missing Indication field is a first Payload Missing Indication field,
a second frame of an optical carrier (OC-N) multi-frame, including a second Backward Defect Indication Payload field, a second Backward Defect Indication Overhead field, a Payload Missing Indication/Forward Defect Indication Payload field, and a Forward Defect Indication Overhead field.

13. The method of claim 12, wherein the second Backward Defect Indication Payload field is a one-bit field, the second Backward Defect Indication Overhead field is a one-bit field, the Payload Missing Indication/Forward Defect Indication Payload field is a two-bit field, and the Forward Defect Indication Overhead field is a one bit field.

14. The method of claim 13, wherein the first byte is byte D4, and the second and third bytes are bytes D7 and D10.

15. The method of claim 1, wherein the optical layer is an optical channel layer.

16. The method of claim 15, wherein information indicative of status in the overhead is assigned to a third frame through a two-hundred-fifteenth frame of an optical carrier (OC-N) multi-frame, comprising a Forward Defect Indication Overhead field, a Forward Defect Indication Payload/Open Connection Indication field, the Backward Defect Indication Payload field, a Client Signal Failure field, and an Optical Channel Layer Trail Trace Identifier field.

17. The method of claim 16, wherein the Forward Defect Indication Overhead field is a one bit field, the Forward Defect Indication Payload/Open Connection Indication field is a two-bit field, the Backward Defect Indication Payload field is a one-bit field, the Client Signal Failure field is a one-bit field, and the Optical Channel Layer Trail Trace Identifier field is an eight-bit field.

18. The method of claim 17, wherein the first byte is a D4 byte,
and the second and third bytes are bytes D7 and D10, respectively; and
wherein the Optical Transmission Section Trail Trace Identifier field comprises eight-byte groups carried within the first synchronous transport signal frame overhead bytes D5, D6, D8, D9, D11, D12, and in the second synchronous signal frame overhead bytes, and in the third synchronous transport overhead bytes.

19. The method of claim 1, wherein the optical layer is a super channel.

20. A method comprising the steps of:
receiving, by circuitry of an optical node adapted for wavelength multiplexing and wavelength switching, a signal over an optical control channel, the signal conforms to an optical carrier (OC-N) frame format, and the signal includes a transport overhead portion of a synchronous transport signal frame format, the transport overhead portion including D4-D12 bytes, a first one of the D4-D12 bytes including first bits of a Backward Defect Indication Payload field, second bits of a Backward Defect Indication Overhead field, and third bits of a Payload Missing Indicator field, the first bits, the second bits, and the third bits being indicative of a status of an optical layer in an optical transport network, a second one of the D4-D12 bytes including the first bits, the second bits, and the third bits, and a third one of the D4-D12 bytes carrying the first bits, the second bits, and the third bits;
receiving, with the interfaces, wavelength division multiplexed optical signals;
terminating, by circuitry of the optical node, the signal at the optical node; and
notifying, by circuitry of the optical node, software of the status of the optical layer in the optical transport network based on at least one of the D4-D12 bytes.

21. A network that complies with an Optical Transport Network, the network, comprising:
a plurality of nodes, one of the plurality of nodes receiving a signal over an optical control channel, the signal conforms to an optical carrier (OC-N) frame format, and the signal includes a transport overhead portion of a synchronous transport signal frame format, the transport overhead portion including D4-D12 bytes, a first one of the D4-D12 bytes including first bits of a Backward Defect Indication Payload field, second bits of a Backward Defect Indication Overhead field, and third bits of a Payload Missing Indicator field, the first bits, the second bits, and the third bits being indicative of a status of an optical layer in an optical transport network, a second one of the D4-D12 bytes including the first bits, the second bits, and the third bits, and a third one of the D4-D12 bytes carrying the first bits, the second bits, and the third bits;
wherein the optical carrier frame format comprising a first synchronous transport signal frame, a second synchronous transport signal frame, and a third synchronous transport signal frame, the synchronous transport signal frames having a synchronous transport signal frame format;
said one of the plurality of nodes further including circuitry that terminates the signal at the optical node, and circuitry notifies software of the status of the optical layer in the Optical Transport Network based on the D4-D12 bytes.

* * * * *